US010257656B2

(12) United States Patent
Bhadricha et al.

(10) Patent No.: US 10,257,656 B2
(45) Date of Patent: Apr. 9, 2019

(54) SYSTEMS AND METHODS OF IMPROVING STABILITY OF A DISPLAYED USER LOCATION USING RECENT LOCATION HISTORY

(71) Applicant: Google Inc., Mountain View, CA (US)

(72) Inventors: Chetan Bhadricha, Fremont, CA (US); Smruti Parichha, Union City, CA (US); Jieru Cheng, Fremont, CA (US); Bhaskar Mehta, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/463,755

(22) Filed: Mar. 20, 2017

(65) Prior Publication Data
US 2018/0270619 A1    Sep. 20, 2018

(51) Int. Cl.
*H04W 24/00*  (2009.01)
*H04W 4/029*  (2018.01)
*H04M 1/725*  (2006.01)

(52) U.S. Cl.
CPC ....... *H04W 4/029* (2018.02); *H04M 1/72572* (2013.01)

(58) Field of Classification Search
CPC ....... H04W 4/02; H04W 4/028; H04W 4/008; H04W 4/023; H04W 4/025
USPC ..................... 455/456.4, 456.1, 414.1, 226.1
See application file for complete search history.

(56) References Cited

U.S. PATENT DOCUMENTS

| | | | | |
|---|---|---|---|---|
| 6,597,738 B1 * | 7/2003 | Park | ........................ | G06T 7/223 375/240.16 |
| 8,560,722 B2 * | 10/2013 | Gates | ............... | H04N 21/41407 707/631 |
| 8,725,164 B2 * | 5/2014 | Lee | ................... | H04M 3/42348 455/414.1 |
| 8,914,305 B2 * | 12/2014 | Buck | ...................... | G06Q 40/04 705/37 |
| 9,424,255 B2 * | 8/2016 | Pengelly | ............... | G06F 17/289 |
| 9,631,944 B2 * | 4/2017 | Cho | ................... | G01C 21/3664 |
| 9,639,858 B2 * | 5/2017 | Busch | ............... | G06Q 30/0261 |
| 9,654,911 B2 * | 5/2017 | Letz | ....................... | H04W 4/02 |
| 9,860,731 B1 * | 1/2018 | Noonan | ............... | H04W 8/005 |
| 2013/0316738 A1 * | 11/2013 | Noonan | ............... | H04W 8/005 455/456.4 |
| 2014/0335888 A1 | 11/2014 | Nomura | | |

(Continued)

FOREIGN PATENT DOCUMENTS

WO    WO 2015/017115    2/2015

OTHER PUBLICATIONS

International Search Report for PCT/US2017/058008 dated Jan. 30, 2018, 11 pages.

*Primary Examiner* — Joseph Arevalo
(74) *Attorney, Agent, or Firm* — Dority & Manning, P.A.

(57) ABSTRACT

Systems and methods for improving a stability of a displayed user location using location history are provided. In one embodiment, the method can include obtaining a location history of a user device corresponding to the user, and determining one or more predicted locations of the user device based at least in part on an application of a smoothing transformation to the location history. The method can further include determining a location of the user device based at least in part on the predicted locations of the user device, and providing the location of the user device to a display device for display.

13 Claims, 9 Drawing Sheets

(56) References Cited

U.S. PATENT DOCUMENTS

2015/0330805 A1* 11/2015 Cho .................. H04W 4/02
                                                                           701/428
2016/0219410 A1    6/2016 Singh et al.
2017/0230800 A1* 8/2017 Edwards ............ H04W 4/029
2017/0374202 A1* 12/2017 Zait .................. H04L 65/80

* cited by examiner

SYSTEMS AND METHODS OF IMPROVING STABILITY OF A DISPLAYED USER LOCATION USING RECENT LOCATION HISTORY

FIELD

The present disclosure relates generally to improving the stability of a displayed user location using a location history of a user.

BACKGROUND

Many different techniques exist for attempting to determine a location associated with a device. For example, a location based on GPS, IP address, cell triangulation, proximity to WiFi access points, proximity to beacon devices, or other techniques can be used to identify a location of a device. The locations reported by one or more devices can be raw location data. For example, the reported location can be a geocode that identifies a latitude and longitude.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining a user device location. The method includes obtaining, by one or more computing devices, a location history of the user device from one or more sources. The location history includes one or more locations associated with the user device at one or more previous times. The method further includes determining, by the one or more computing devices, a predicted location corresponding to a location of the user device at a current time, based at least in part on an application of a smoothing transformation to the one or more locations in the location history. The method further includes determining, by the one or more computing devices, a location of the user device based at least in part on the predicted location. The method further includes providing, by the one or more computing devices, data indicative of the location of the user device to a display device for display.

Other example aspects of the present disclosure are directed to systems, apparatus, tangible, non-transitory computer-readable media, user interfaces, memory devices, and electronic devices for improving the stability of user location.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which make reference to the appended figures, in which.

DETAILED DESCRIPTION

Figure 1:
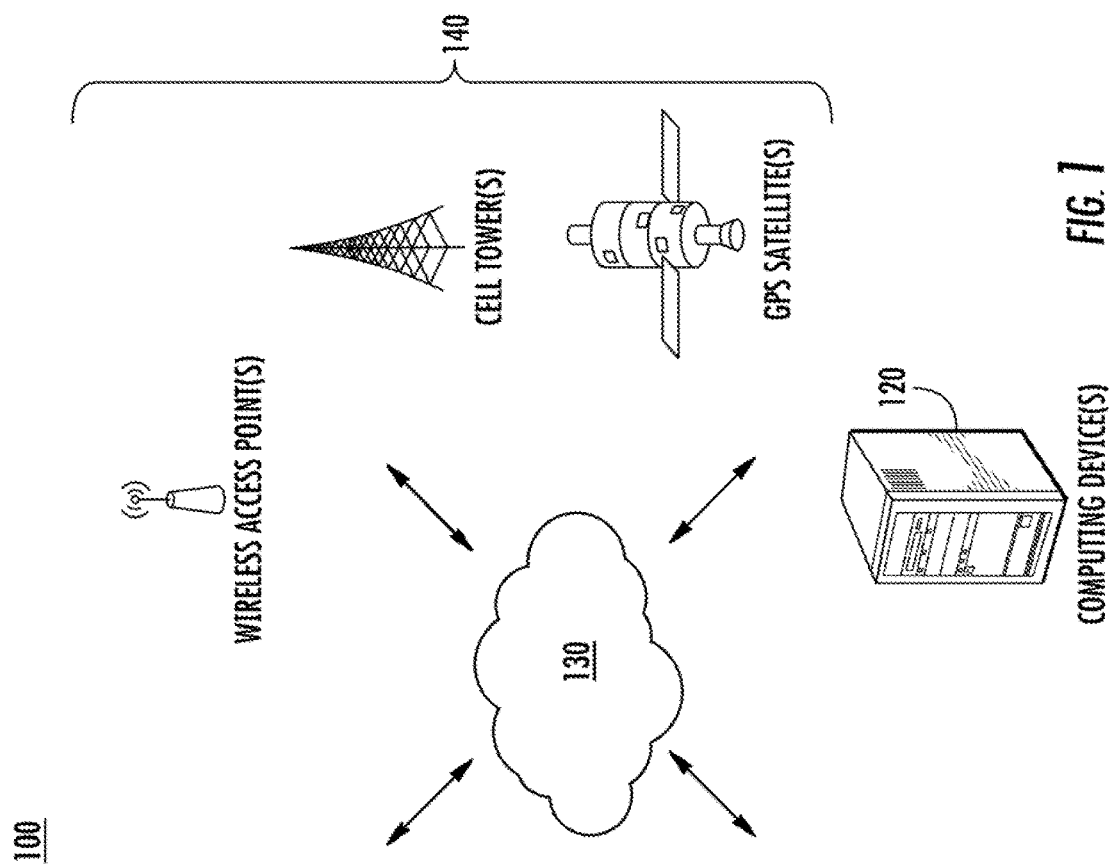
FIG. 1 depicts an illustrative system, in accordance with some implementations of the present disclosure.
Figure 1:
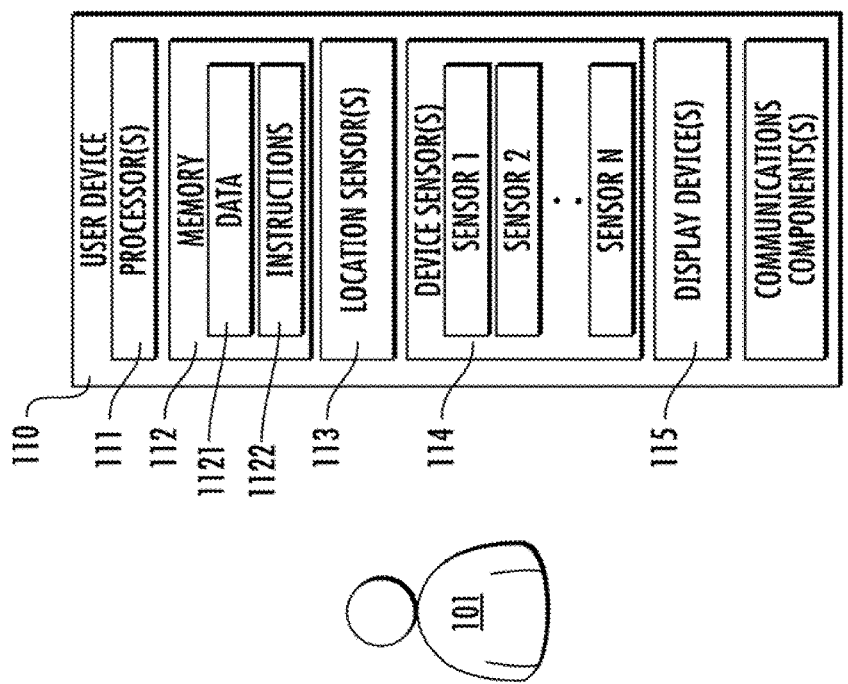

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to systems and methods that improve the stability of a displayed user location by determining a location of a user device corresponding to the user by using a location history of the user device in conjunction with a location estimate and/or device sensor data of the user device. For instance, in some implementations, a user device (e.g., mobile phone, laptop, desktop, wearable device, etc.) can obtain a location history (e.g., from local memory, a remote source, etc.). The location history can include, for example, one or more locations associated with the user device at one or more previous times. The user device can determine a predicted location corresponding to a location of the user device at a current time by applying a smoothing transformation to the location history. In some implementations, a user device can also obtain a location estimate from one or more location sensors (e.g., GPS receiver, cellular radio, WiFi radio, etc.) on the user device. The location estimate can include an approximate location associated with the user device at a current time. The user device can determine a location of the user device based at least in part on the location history and location estimate. In some implementations, a user device can also (or alternatively) obtain device sensor data from one or more device sensors (e.g., accelerometer, gyroscope, magnetometer, etc.) on the user device. The device sensor data can include, for example, an acceleration, rotation, direction, and/or other metric of the user device. The user device can determine a location of the user device based at least in part on the location history and the device sensor data. In some implementations, a user device can obtain a location estimate (from the location sensor(s)) and device sensor data (from the device sensor(s)) in addition to a location history, and the user device can determine a location of the user device based at least in part on the location history, location estimate, and device sensor data. In some implementations, the user device can send the location of the user device to a display device for displaying. The stability of the displayed user location can be improved by determining a location of the user device based at least in part on the location history and at least one of the location estimate and device sensor data. Improved stability of a displayed user location can advantageously facilitate improved navigation in mobile mapping applications and/or improved performance in other computing device applications that utilize a user device location.

Systems and methods of the present disclosure can include a user device that can obtain a location history, location estimate, and/or device sensor data, as well as communicate with one or more computing devices (e.g., remote from the user device). The user device can be provided with controls allowing a user to make an election as to both if and when systems, sensors, programs, or features described herein can enable collection of user information (e.g., a user's location), and if the user is sent content or communication from a server. In addition, certain data obtained by a user device can be treated in one or more ways before it is stored or used, so that personally identifiable information is removed. For example, a user's identity can be treated so that no personally identifiable information can be determined for the user. Thus, a user can have control over what information is collected at or from a user device, how that information is used, and what information is provided to the user.

The user device can obtain a location history that can include one or more locations associated with the user device at one or more previous times. For example, at a current time T, a user device can obtain a location history that includes one or more first locations associated with the user device at a previous time T−1, one or more second locations associated with the user device at a previous time T−2, one or more third locations associated with the user device at time T−3, and one or more fourth locations associated with the user device at a previous time T−4. In some implementations, the location history can include no locations associated with the user device at a previous time. For example, a user device can obtain a location history that includes one or more first locations associated with the user device at a previous time T−1, no second location associated with the user device at a previous time T−2, and one or more third locations associated with the user device at time T−3. In some implementations, the user device can store the one or more locations associated with the user device at one or more previous times in a local memory, and retrieve the one or more locations from the local memory to obtain a location history. In some implementations, the user device can request a location history from a server that stores the location history (e.g., the one or more locations associated with the user device at one or more previous times). The user device can apply a smoothing transformation to the location history to determine a predicted location corresponding to the user device at a current time. The user device can determine a location of the user device at the current time based at least in part on the predicted location.

In some implementations, a user device can determine a location history window based at least in part on the location history. The location history window can include one or more locations from among the location history, specifically one or more locations associated with the user device at a recent time. The user device can apply a smoothing transformation to the location history window (e.g., the one or more locations associated with the user device at a recent time) to determine a predicted location associated with the user device at a current time. For example, the user device can determine that only locations of the user device within the previous two minutes are relevant. The user device can determine the location history window to include only locations associated with the user device that are within two minutes of a current time.

In some implementations, a user device can determine a size of a location history window and determine the location history window based at least in part on the determined size. The user device can determine a size of a location history window based at least in part on a speed and/or direction of the user device. For instance, the user device can determine a size of a location history window to be smaller if a determined speed is high (e.g., that only very recent locations of the user device are relevant). Alternatively, the user device can determine a size of a location history window to be larger if a determined speed is low (e.g., that less recent previous locations of the user device are relevant). Likewise, the user device can determine a size of a location history window to be smaller if a direction of the user device has changed, and can determine a size of a location history window to be larger if a direction of the user device has not changed. In some implementations, a user device can determine one or more of a previous speed and a previous direction of the user device based at least in part on a location history of the user device. For instance, the user device can determine a first speed and/or direction of the user device based at least in part on two or more locations of the user device within a first time window, a second speed and/or direction of the user device based at least in part on two or more locations of the user device within a second time window, etc. The user device can determine the location history window based at least in part on the one or more previous speeds and/or directions of the user device. In some implementations, a user device can dynamically adjust a location history window as the speed and/or direction of the user device changes. For example, the user device can incrementally increase a size of a location history window if a speed of the user device decreases, and incrementally decrease a size of a location history window if a speed of the user device increases. Likewise, the user device can increase a size of a location history window if a direction of the user device remains unchanged, and decrease a size of a location history window if a direction of the user device changes frequently.

In some implementations, the location history can include one or more previous location estimates, each corresponding to an approximate location of the user device at a previous time. For example, at a current time T, a user device can obtain a location estimate that includes an approximate location of the user device at time T. At time T+1, the current time T is a previous time, and analogously the location estimate at time T is a previous location estimate (e.g., the location estimate at time T includes an approximate location of the user device at a previous time).

In some implementations, a server can determine a location history or location history window of the user device. In some implementations, a server can also apply a smoothing algorithm to the location history or location history window to determine a predicted location corresponding to a location of the user device at a current time. The server can send one or more of the determined location history, location history window, and predicted location to a user device.

The user device can, in some implementations, obtain a location estimate from one or more location sensors on the user device. The location estimate can include an approximate location associated with the user device at a current time. For example, the location estimate can include GPS coordinates of the user device obtained from a GPS receiver on the user device, a triangulated position of the user device calculated based at least in part on communications between cell towers and a cellular radio on the user device, a proximity to a fixed location such as a WiFi access point, or a beacon as determined by a WiFi or Bluetooth radio on the user device. In some implementations, the location estimate can be based on a previously determined location of the user device. The location estimate can include one or more locations associated with the user device at a current time. For example, the location estimate can include a first location associated with the user device at a current time, and a second location associated with the user device at a current time. Each location associated with the user device at a current time can be from a different source. For example, the first location associated with the user device at the current time can be obtained from a GPS receiver on the user device, and the second location associated with the user device at the current time can be obtained from a WiFi radio on the user device. The one or more approximate locations associated with the user device at a current time can include, for example, location data indicative of a longitudinal position, a latitudinal position, and/or an altitude/elevation of the user device. In some implementations, a location estimate can be a probability distribution indicating a likelihood that the user device is at one or more locations at the current time. The user device can obtain a location estimate at a frequency limited by a propagation time of location sensor signals (e.g. GPS signals must propagate from GPS satellites in orbit around the Earth to the user device, cellular signals must propagate from cell towers locations to the user device, WiFi signals must propagate from a WiFi access point to the user device, etc.). The frequency of the location estimate can also be limited by other factors that affect the propagation time or accuracy of the sensor signals (e.g., interference, physical barriers, etc.).

The user device can determine a location of the user device based at least in part on a location history and location estimate of the user device. For example, the user device can determine a predicted location of the user device based at least in part on a location history, as described above. The user device can also obtain a location estimate, as described above. The user device can determine a location of the user device at a current time based at least in part on the predicted location and the location estimate.

The user device can, in some implementations, obtain device sensor data from one or more device sensors on the user device. The device sensor data can include, for example, acceleration data from an accelerometer on the user device, rotational data from a gyroscope on the user device, directional data from a magnetometer on the user device, and/or other data associated with sensors on the user device. The user device can obtain the device sensor data, for example, at a frequency limited by the circuitry of each device sensor and the user device.

The user device can determine a location of the user device based at least in part on a location history and device sensor data of the user device. For example, the user device can determine a speed and/or direction of the user device based at least in part on one or more of acceleration data, rotational data, directional data, etc. of the user device. The user device can determine a location history window based at least in part on the speed and/or direction determined from the device sensor data. In some implementations, the user device can also determine a speed and/or direction of the user device based at least in part on a location history, and determine a location history window based at least in part on one or more of the location history and device sensor data. The user device can determine, based at least in part on the location history window, a predicted location corresponding to a location of the user device at a current time. As described above, the user device can then determine the location of the user device at the current time, based at least in part on the predicted location, the location of the user device at the current time.

The user device can, in some implementations, obtain a location history, location estimate, and device sensor data. The user device can determine a location of the user device based at least in part on the location history, location estimate, and device sensor data. For example, the user device can determine a location history window based at least in part on the location history and the device sensor data. The user device can apply a smoothing transformation to the location history window to determine a predicted location corresponding to a location of the user device at a current time. Then, the user device can determine a location of the user device based at least in part on the predicted location and the location estimate.

The systems and methods described herein may provide a number of technical effects and benefits. For instance, the disclosed techniques can provide improved accuracy in determining user locations. When using only location data to determine user device locations, the determined locations sometimes lack a desired level of accuracy. For example, a user in a building may be determined as walking in the middle of a street based purely on location data from a user device. By evaluating location data relative to location history, realistic constraints for possible user locations as they move from one place to another can help to improve location determinations and stability of a displayed user location.

Another example technical effect and benefit of the present disclosure is improved computational processing speed for determining user device locations. Location data obtained using location sensors in a user device can typically be obtained at a frequency of about once every second. This level of latency can result from a time it takes to perform a new WiFi scan, receive a new GPS reading, or the like. Translation vectors, rotation vectors, or other sensor data can be determined from sensors in a mobile device with much greater frequency (e.g., 10 times per second or more). By considering translation vectors, rotation vectors, or other sensor data in addition to evaluating location data relative to location history, predictions for a user's next location can be generated on a much more frequent basis, thus resulting in a smoother predicted travel path for a user.

Yet another example technical effect and benefit of the present disclosure is improved navigation. By having more accurate determinations of the current geographic location of a mobile device, a mapping application can route a user from one location to another with increased precision and efficiency. More advanced navigational options may also be afforded. For instance, if a user makes an abrupt change in speed or direction, the mapping application can respond quickly to update the route accordingly. Likewise, if a user does not slow down or change direction ahead of an off ramp on a freeway, the mapping application can predict that the user will not be able to safely take the turn and update the route accordingly.

The systems and methods described herein may also provide a technical effect and benefit of improved computer technology. More particularly, computing system performance and processing speed within mobile devices and mapping applications can be enhanced by improving the accuracy of determined user location. More accurate determination of current location can improve not only the performance within mapping applications but also other applications running on a mobile device that use location sensor data. By providing a streamlined approach for determining location, more seamless and effective display and utilization of location data can be afforded to a user.

With reference now to the FIGS., example embodiments of the present disclosure will be discussed in further detail. FIG. 1 depicts an example system 100 for determining a location of a user device according to example embodiments of the present disclosure. The system 100 can include a user device 110 (e.g., cell phone, laptop, wearable device, etc.) that corresponds to a user 101. A location of the user device 110 can correspond to a location of a user 102. In some implementations, the system 100 can include one or more computing devices 120, and/or one or more signal sources 140. The signal source(s) 140 can include, for example, one or more wireless access points, cell towers, GPS satellites, and other signal source types. In some implementations, the user device 110, computing device(s) 120, and/or the signal source(s) 140 can communicate with each other over a network 130, as described herein (e.g., wireless communication network, other network).

The computing device(s) 120 can include, for example, one or more servers that are remote from the user device 110. The computing device(s) 120 can include various components for performing various operations and functions. For example, and as further described herein, the computing device(s) 120 can store instructions that when executed by one or more processors cause the one or more processor to perform the operations and functions, for example, as those described herein for determining a stable user device location. The computing device(s) 120 can be, for instance, associated with a server system (e.g. a cloud-based server system).

In some implementations, the user device 110 can include one or more processors 111 and a memory 112. The memory 112 can store data 1121 (e.g., a location history, a location history window, etc.) and/or computer readable instruction(s) 1122. In some implementations, the user device 110 can include one or more of location sensor(s) 113 (e.g., GPS, cell radio, WiFi radio, etc.), device sensor(s) 114 (e.g., accelerometer, gyroscope, magnetometer, etc.), and display device(s) 115 (e.g., a display screen). The signal source(s) 140 can transmit location sensor data, and the user device 110 can obtain the location sensor data via the location sensor(s) 113. In some implementations, the signal source(s) 140 can transmit location sensor data in response to a request from the user device 110. The location sensor data can include a location estimate of the user device 110.

Figure 2:
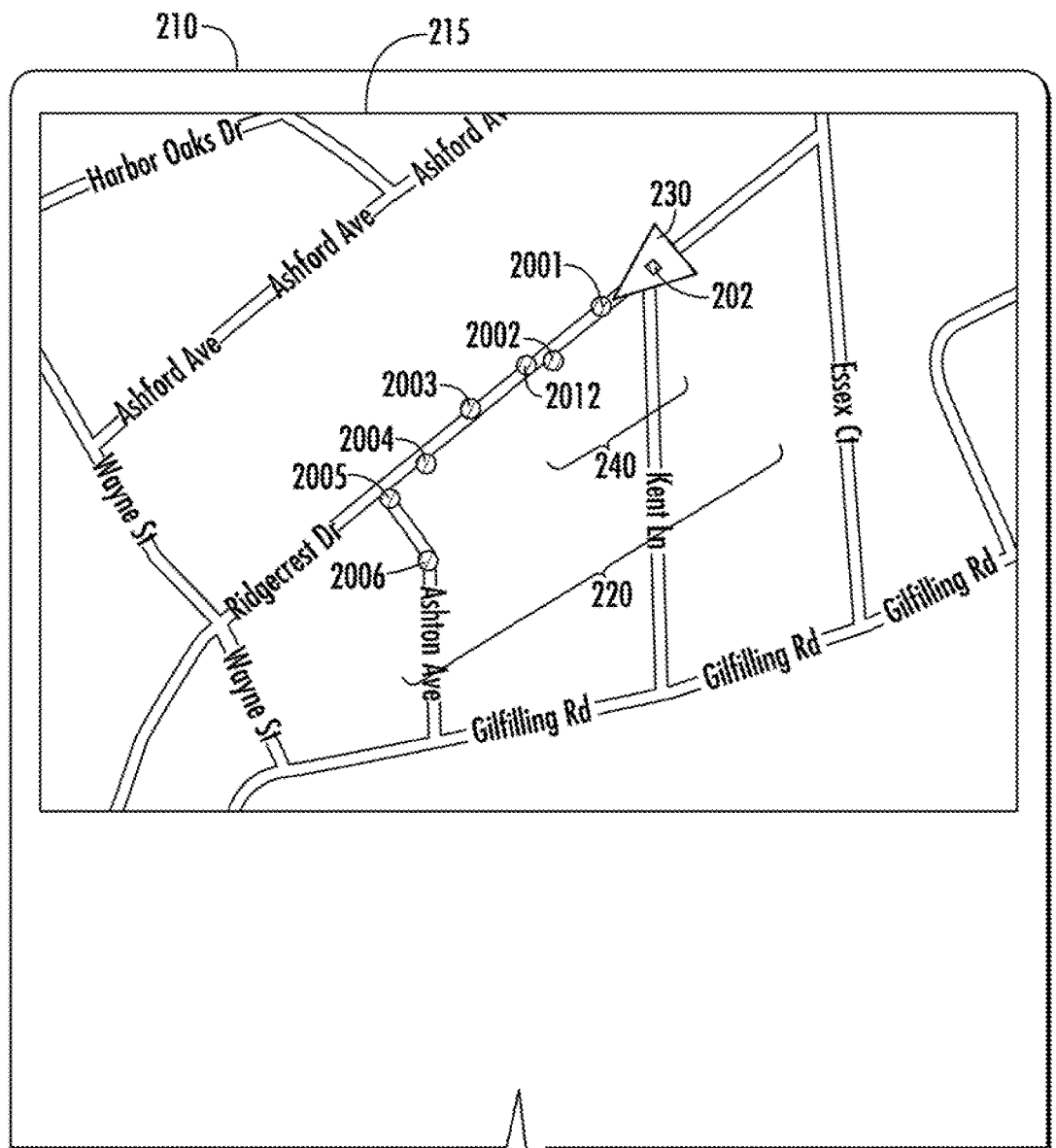
FIG. 2 depicts an illustrative display device displaying a location of a user device, in accordance with some implementations of the present disclosure.

FIG. 2 depicts an example illustration of a user device 210 with a display device 215. The user device 210 can be configured to periodically provide one or more raw location reports. For example, FIG. 2 depicts a plurality of circular markers that respectively correspond to a plurality of locations respectively provided by a plurality of location reports. Each marker can correspond to a location associated with the user device at a particular time. Each of the plurality of location reports can include at least a set of data indicative of an associated location (e.g., $L_1$) and time (e.g., $T_1$).

In some implementations, the display device 215 can display one or more of a determined location 202, a location history 220, one or more predicted locations 230, and a location history window 240 of the user device 210. In some implementations, the user device 210 can obtain the location history 220 from one or more sources (e.g., a local memory on a user device, a memory on another computing device, etc.).

The location history 220 can include one or more locations associated with the user device 210 at one or more previous times. For example, the location history 220 can include location 2001 associated with the user device 210 at a time T−1, locations 2002 and 2012 associated with the user device 210 at a time T−2, location 2003 associated with the user device 210 at a time T−3, location 2004 associated with the user device 210 at a time T−4, etc. Each location associated with the user device 210 at a particular time can be obtained from a different source. For example, the location 2002 at time T−2 can be obtained from a first source (e.g., GPS) and the location 2012 at time T−2 can be obtained from a second source (e.g., WiFi).

The user device 210 can determine the predicted location(s) 230 based at least in part on the location history 220. For example, the user device 210 can apply a smoothing algorithm to the location history 220 to determine the predicted location(s) 230. The predicted location(s) 230 can include one or more possible locations of the user device 210 at a current time T (e.g., locations that would be included within the boundary shape shown in FIG. 2). The user device 210 can determine the location 202 of the user device 210 based at least in part on the predicted location(s) 230. For example, the user device 210 can determine the location 202 to be the same as predicted location(s) 230. As another example, the user device 210 can determine the location 202 to be within the predicted location(s) 230. As yet another example, the user device 210 can determine the location 202 to be partly or completely outside the predicted location(s) 230, as will be described below. In this way, even if the user device 210 is unable to obtain a location estimate at a current time, the user device 210 can use the location history 220 increase precision of a displayed location 202 and improve the stability of the displayed location 202.

In some implementations, the user device 210 can determine a location history window 240 based at least in part on the location history 220. The location history window 240 can include one or more locations associated with the user device 210 at one or more recent times. For example, the user device 210 can determine the location history window 240 to include only the locations associated with the user device 210 within a recent time of T−2. The user device 210 can determine the location history window 240 to include the locations 2001, 2002, and 2012. In some implementations, the user device 210 can determine the predicted location(s) 230 based at least in part on the location history window 240. For example, the user device 210 can apply a smoothing transformation to the location history window 240 (e.g., the locations associated with the user device at one or more recent times) to determine the predicted location(s) 230. The smoothing transformation can generate an approximating function that attempts to capture important patterns in the location data (e.g., location history, location estimate(s), device sensor data, etc.) of a user device, while leaving out noise, in order to predict a future location of the user device. For example, the user device 210 can consider each of the locations 2001, 2002, 2012, 2003, 2004, 2005, and 2006 in the location history 220, and interpolate the data to determine the predicted location(s) 230. In another example, the user device 210 can omit locations 2003, 2004, 2005 and 2006 to determine the location history window 240. The user device 210 can consider each location in the location history window 240 and interpolate the data to determine the predicted location(s) 230. In this way, previous location estimates and/or previous locations that are less relevant to a current location of the user device 210 are excluded by the smoothing transformation, and the smoothing algorithm can be used to increase precision of a displayed location 202 and improve the stability of the displayed location 202.

Figure 3A:
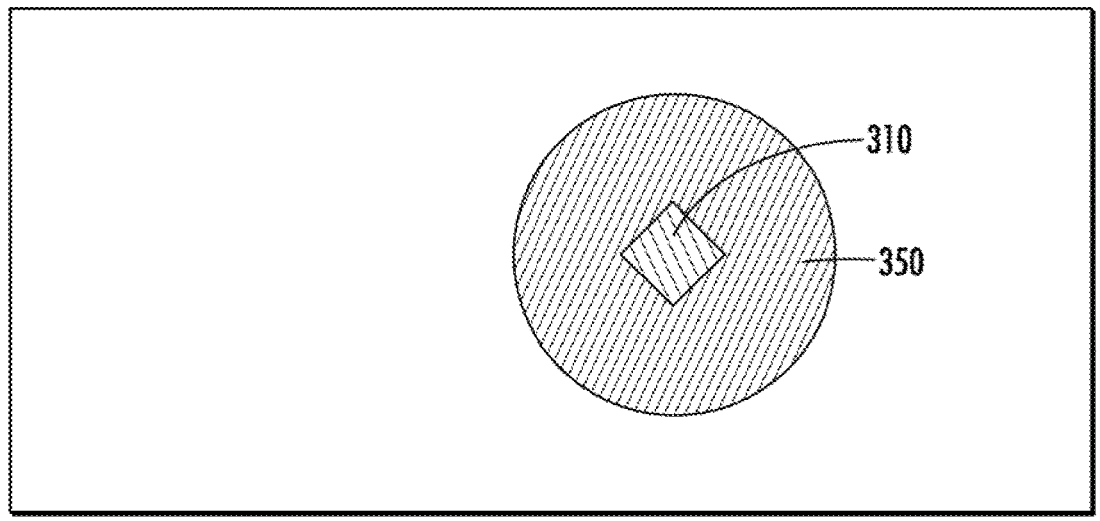
FIGS. 3A-3B depict example views of determining a location of a user device based on a location history and a location estimate, in accordance with some implementations of the present disclosure.
Figure 3B:
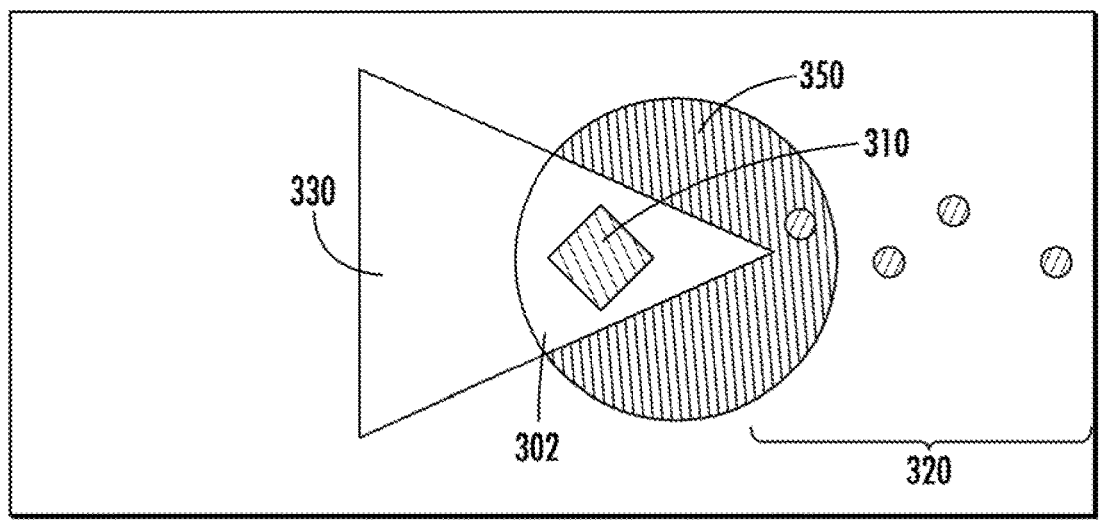

FIGS. 3A-3B depict example views of determining a location 302 of a user device 310 based at least in part on a location history 320 and a location estimate 350. The user device 310 can obtain the location history 320 (e.g., one or more locations associated with the user device 310 at one or more previous times) and determine predicted location(s) 330 similar to the description above with respect to FIG. 2. The user device 310 can determine the location 302 based at least in part on the predicted location(s) 330 and the location estimate 350. For example, the user device 310 can search for an overlap between the predicted location(s) 330 and location estimate 350 to determine the location 302. In this way, the location estimate 350 can be used to increase a precision of the displayed location 302 and improve the stability of the displayed location 302.

Figure 4A:
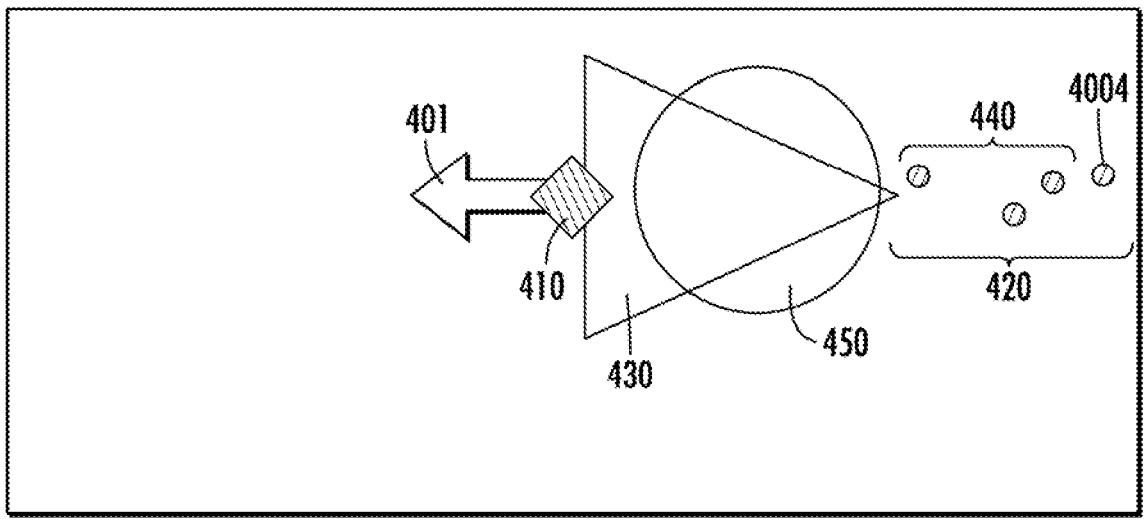
FIGS. 4A-4B depict example views of determining a location of a user device based on a location history and an acceleration of the user device, in accordance with some implementations of the present disclosure.
Figure 4B:
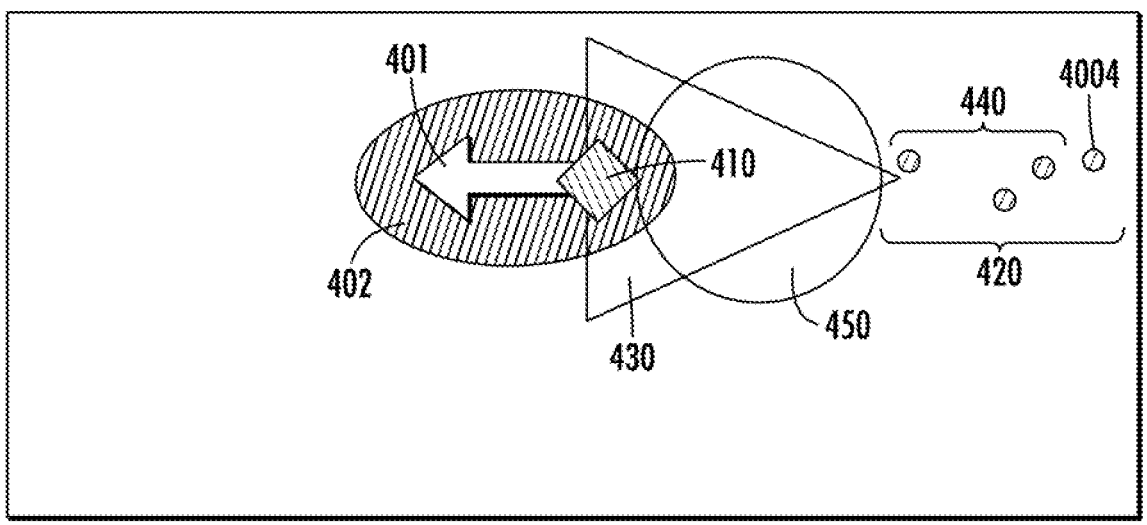

FIGS. 4A-4B depict example views of determining a location 402 of a user device 410 based at least in part on a location history 420 and a change in position 401 of the user device 410. The user device 410 can obtain the location history 420 as described above with respect to FIG. 2. In some implementations, the user device 410 can obtain device sensor data (e.g., an acceleration, rotation, direction, etc.) from one or more device sensors (e.g., accelerometers, gyroscopes, magnetometers, etc.) on the user device 410. The device sensor data can indicate the change in position 401 of the user device 410. In some implementations, the user device 410 can measure a magnitude and/or direction of the change in position 401. In some implementations, the change in position 401 can be an acceleration of the user device 410. The user device 410 can determine the location 402 based at least in part on the predicted location(s) 430 (see FIG. 2) and the change in position 401. For example, if acceleration is high (e.g., to the left as shown in FIG. 4A), then the user device 410 can determine the location 402 to be shifted and/or stretched by a larger amount in the direction of an associated vector (e.g., to the left of the predicted location(s) 430). Alternatively, if acceleration is low, then the user device 410 can determine the location 402 to be shifted and/or stretched by a smaller amount in the direction of an associated vector (e.g., to the left of the predicted location(s) 430). In another example, if an acceleration of the user device 410 is in an opposite direction to the change in position 401, then the user device 410 can determine the location 402 to be shifted and/or stretched in the opposite direction of an associated vector (e.g., to the right with respect to the predicted location(s) 430). In yet another example, if acceleration is at an angle with respect to the change in position 401, then the user device 410 can determine the location 402 to be shifted and/or stretched at a corresponding angle. In some implementations, the user device 410 can obtain location estimate 450, and determine the location 402 by shifting and/or stretching the location estimate 450. For example, the location estimate 450 can be shifted and/or stretched based at least in part on the change in position 401 to determine the location 402. In this way, the device sensor data can be used to increase a precision of a displayed location 402 and improve the stability of the displayed location 402.

Figure 5A:
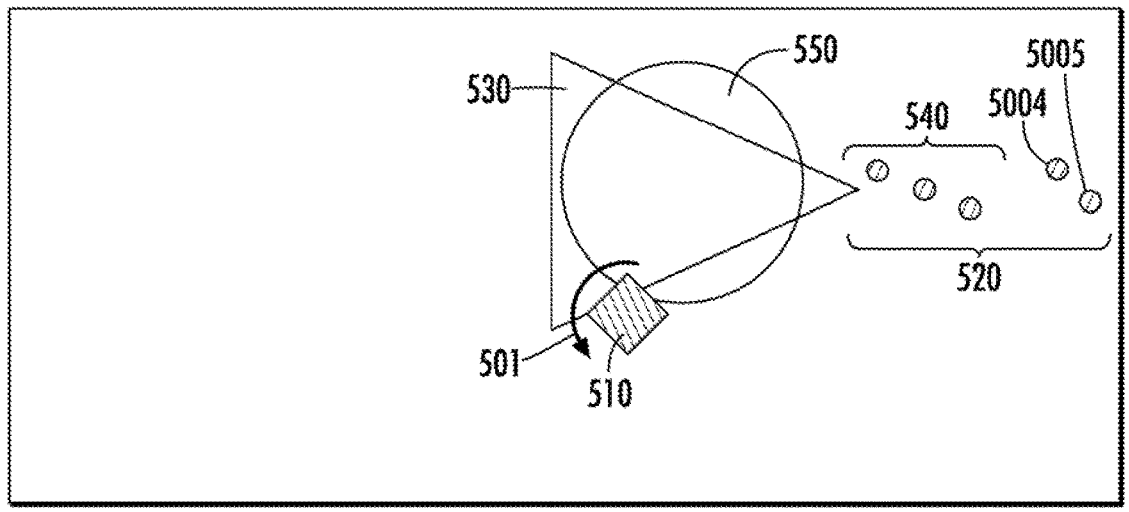
FIGS. 5A-5B depict example views of determining a location of a user device based on a location history and a rotation of the user device, in accordance with some implementations of the present disclosure.
Figure 5B:
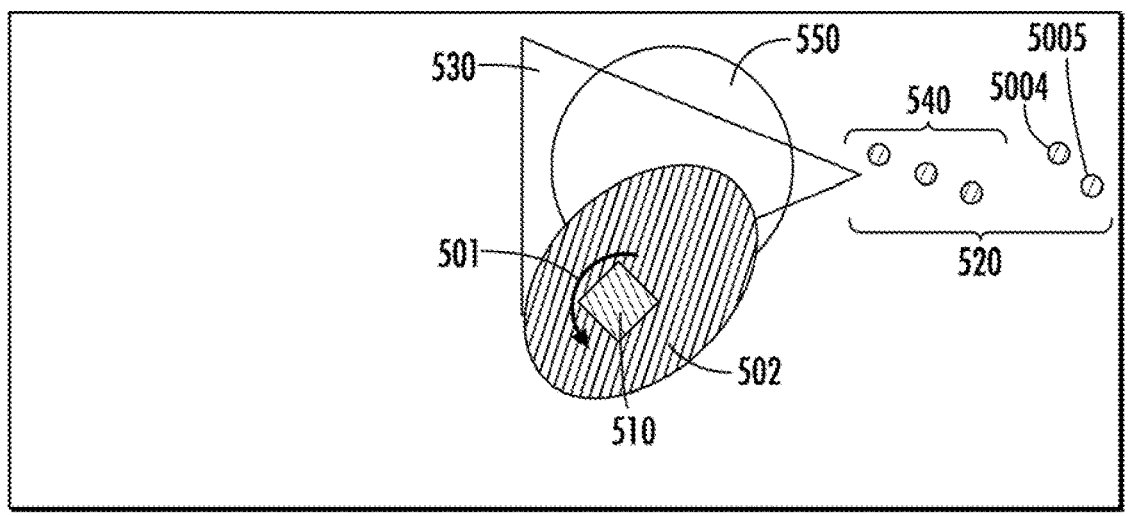

FIGS. 5A-5B depict example views of obtaining a location 502 of a user device 510 based at least in part on a location history 520 and a change in position 501 of the user device 510. The user device 510 can obtain the location history 520 as described above with respect to FIG. 2 (e.g., from a local memory and/or a remote source). The user device 510 can determine the change in position 501 as described above with respect to FIGS. 4A-4B. In some implementations, the change in position 501 can be a rotation of the user device 510. In some implementations, the user device 510 can determine the location 502 based at least in part on the predicted location(s) 530 (see, e.g., FIG. 2) and the change in position 501. For example, if a rotation is clockwise, then the user device 510 can determine the location 502 to be shifted and/or stretched in the clockwise direction. If a rotation is counter-clockwise, then the user device 510 can determine the location 502 to be shifted and/or stretched in the counter-clockwise direction. In some implementations, if a magnitude of a rotation is high, then the user device 510 can determine the location 502 to be shifted and/or stretched by a larger amount. If a magnitude of a rotation is low, then the user device 510 can determine the location 502 to be shifted and/or stretched by a smaller amount. In some implementations, the user device 510 can obtain location estimate 550, and determine the location 502 by shifting and/or stretching the location estimate 550. The location estimate 550 can be shifted and/or stretched based at least in part on the change in position 501. In this way, the device sensor data can be used to increase a precision of a displayed location 502 and improve the stability of the displayed location 502.

Figure 6A:
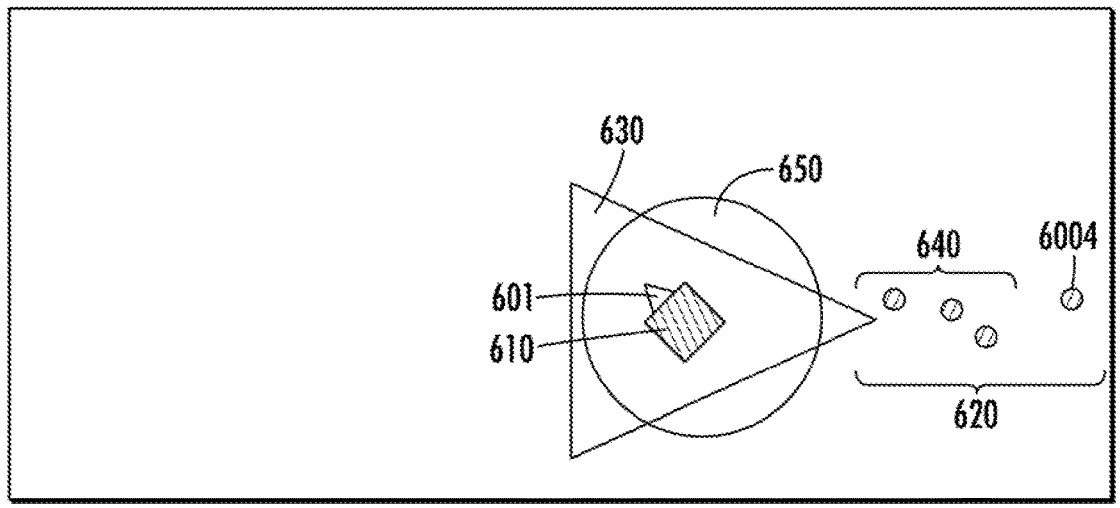
FIGS. 6A-6B depict example views of determining a location of a user device based on a location history and a direction of the user device, in accordance with some implementations of the present disclosure.
Figure 6B:
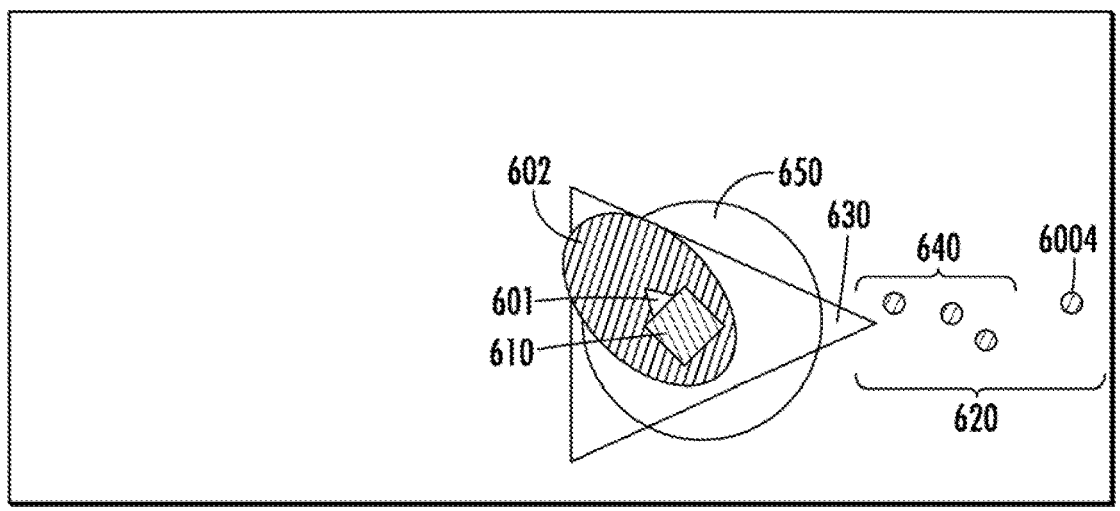

FIGS. 6A-6B depict example views of obtaining a location 602 of a user device 610 based at least in part on a location history 620 and a change in position 601 of the user device 610. The user device 610 can obtain the location history 620 as described above with respect to FIG. 2. The user device 610 can determine the change in position 601 as described above with respect to FIGS. 4A-4B and/or FIGS. 5A-5B. In some implementations, the change in position 601 can be a change in direction of the user device 610. For example, if a user is at a position (0, 0) and spins in a circle then the change in position 601 can be determined to be a change in direction or heading of the user device 610. In some implementations, if a user is moving in one direction but has turned to face a different direction, then the change in position 601 can be determined to be a change in direction or heading (e.g., in the direction faced by the user). In some implementations, the user device 610 can determine the location 602 based at least in part on the predicted location(s) 630 (see, e.g., FIG. 2) and the change in position 601. For example, if a change in direction is fast, then the user computer device 610 can determine the location 602 to be shifted and/or stretched by a greater amount. Alternatively, if a change in direction is slow, then the user computer 610 can determine the location 602 to be shifted and/or stretched by a smaller amount. In some implementations, the user device 610 can obtain location estimate 650, and determine the location 602 by shifting and/or stretching the location estimate 650. For example, the location estimate 650 can be shifted and/or stretched based at least in part on the change in position 601 to determine the location 602. In this way, the device sensor data can be used to increase a precision of a displayed location 602 and improve the stability of the displayed location 602.

Figure 7:
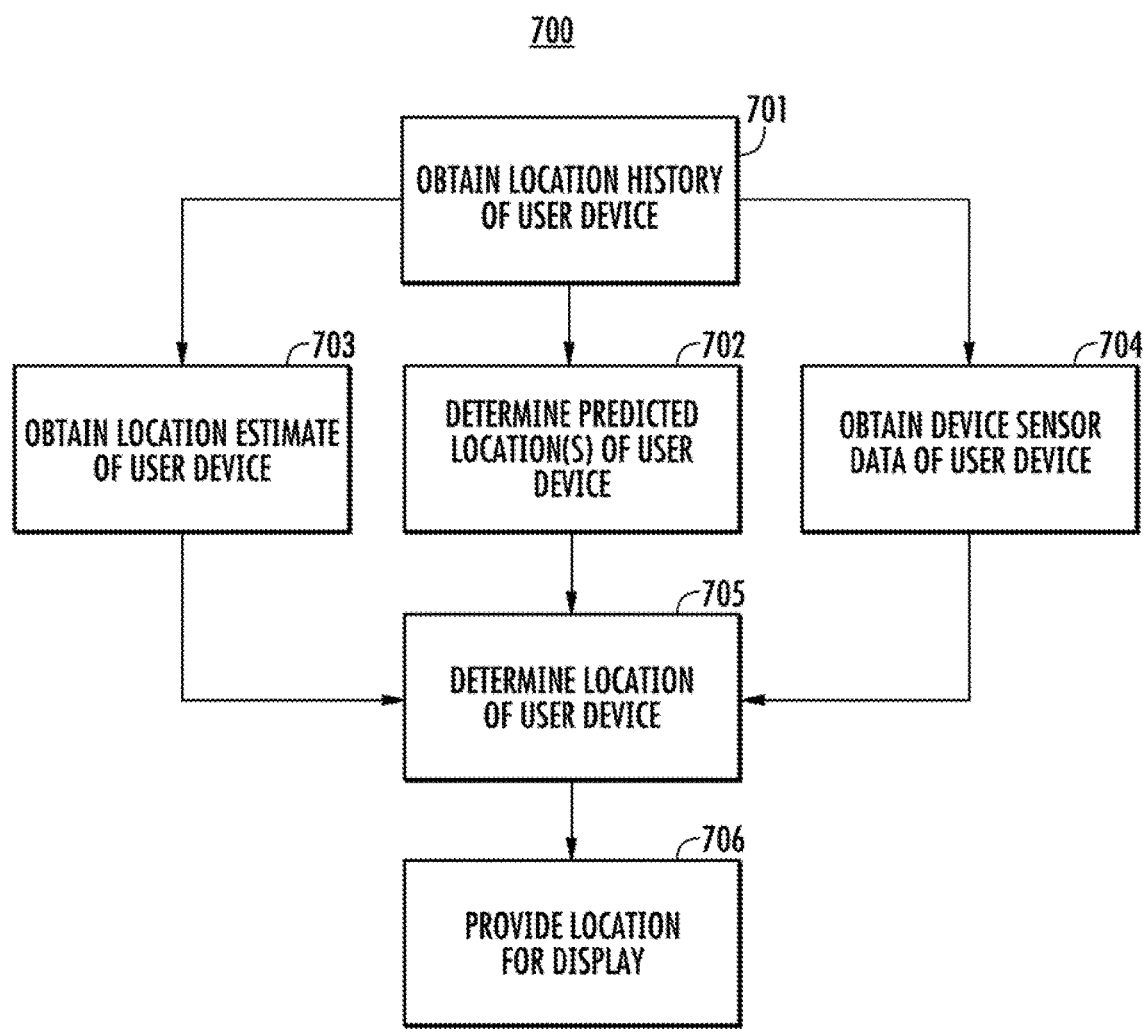
FIG. 7 depicts a flow diagram of illustrative steps for determining a location of a user device, in accordance with some implementations of the present disclosure.

FIG. 7 depicts a flow diagram of an example method 700 of determining user device location and for improving a stability of a displayed user location, according to example embodiments of the present disclosure. Method 700 can be implemented by one or more computing devices, such as among the user device or computing devices depicted in FIGS. 1-6. Moreover, one or more portion(s) of the method 700 can be implemented as an algorithm on the hardware components of the device(s) described herein (e.g., as in FIGS. 1-6) to, for example, determine user device location. FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (701), the method 700 can include obtaining location history of a user device. In some implementations, a user device can obtain a location history from one or more sources. The location history can include one or more locations associated with the user device at one or more previous times. A user device 110 can obtain the location history from a memory 112 on the user device 110 or from one or more computing devices 120. In some implementations, a user device 310 can obtain a location estimate 350 at a current time T, and store the location estimate 350 in memory to use as part of a location history of the user device 310 at a later time.

At (702), the method 700 can include applying a smoothing transformation to the location history and determining one or more predicted locations associated with the user device. For example, a user device 210 can apply a smoothing transformation to location history 220 to determine predicted location(s) 230. Additionally, or alternatively, the user device 210 can apply a smoothing transformation to location history window 240 to determine predicted location(s) 230, as described herein.

At (703), the method 700 can include obtaining a location estimate of the user device. For example, the user device 110 can include location sensor(s) 113 to receive one or more sensor signals from the signal source(s) 140. The sensor signal(s) can include data indicative of an approximate location of the user device 110 at a current time.

At (704), the method 700 can include obtaining device sensor data associated with a change in position of the user device. For example, the user device 110 can include device sensor(s) 114 that each measure an aspect of the change in position of the user device 110 such as, for example, an acceleration, rotation, translation, etc. The device sensor(s) 114 can store each measurement in memory 112, and the user device 110 can obtain the device sensor data from the memory 112.

At (705), the method 700 can include determining a location of the user device based at least in part on the location history. For example, as described above with respect to FIG. 2, a user device 210 can obtain location history 220 to determine a location 202 of the user device 210. In some implementations, at (705) the method 700 can include determining a location of the user device based at least in part on the location history and the location estimate. For example, as described above with respect to FIG. 3, a user device 310 can obtain location history 320 and location estimate 350 to determine a location 302 of the user device 310. In some implementations, at (705) the method 700 can include determining a location of the user device based at least in part on the location history and the device sensor data. For example, as described above with respect to FIGS. 4-6, a user device 410, 510, or 610 can obtain location history 420, 520, or 620 and device sensor data 401, 501, or 601; and determine a location 402, 502, or 602 based at least in part on the location history 420, 520, or 620 and device sensor data 401, 501, or 601; respectively. In some implementations, at (705), the method 700 can include determining a location of the user device based at least in part on the location history, the location estimate, and the device sensor data. For example, as described above with respect to FIGS. 4-6, a user device 410, 510, or 610 can obtain location history 420, 520, or 620 and device sensor data 401, 501, or 601 to determine location history window 440, 540, or 640; and determine a location 402, 502, or 602 based at least in part on the location history window 440, 540, or 640 and the location estimate 450, 550, or 650; respectively.

At (706), the method 700 can include providing data indicative of a location of the user device to a display device for display. For example, the user device 210 can provide data indicative of one or more of location 202, location history 220, predicted location(s) 230, and location history window 240 to the display device 214 for display. In some implementations, the user device 310 can provide data indicative of one or more of location 302, location history 320, predicted location(s) 330, and location estimate 350. In some implementations, each of the user devices 410, 510, and/or 610 can provide data indicative of one or more of a change in position 401, 501, and/or 601; location 402, 502, and/or 602; location history 420, 520, or 620; and predicted location(s) 430, 530, and/or 630; respectively.

Figure 8:
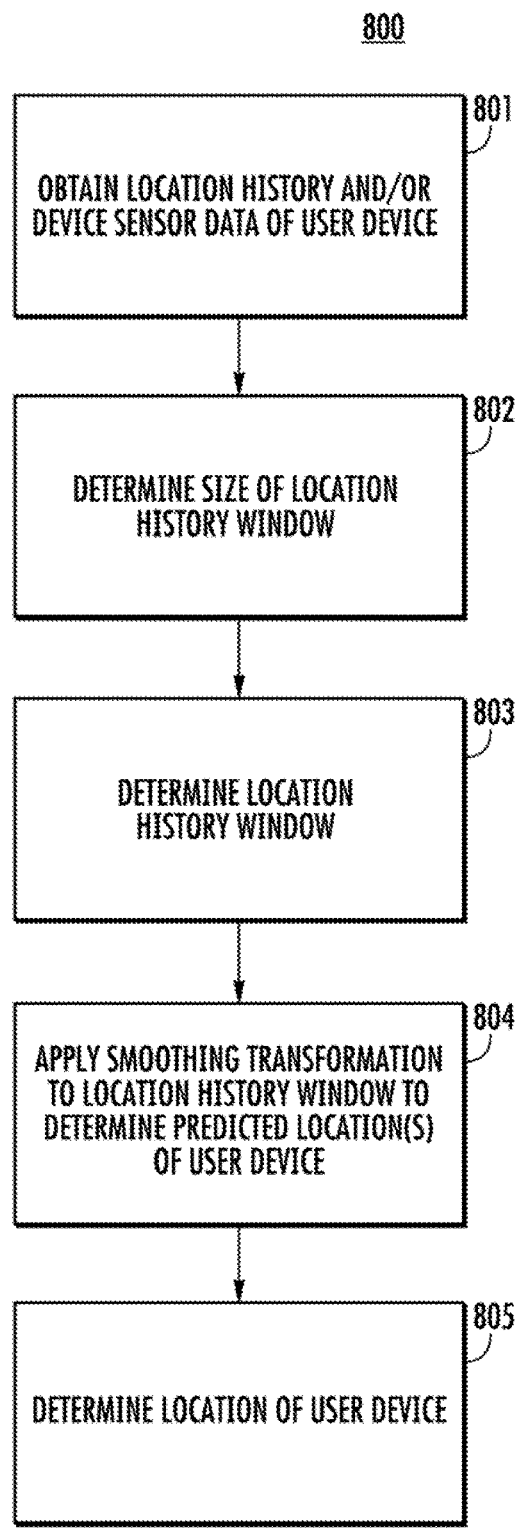
FIG. 8 depicts a flow diagram of illustrative steps for determining a location history window of a user device, in accordance with some implementations of the present disclosure.

FIG. 8 depicts a flow diagram of an example method 800 of determining a location history window of a user device, according to example embodiments of the present disclosure. Method 800 can be implemented by one or more computing devices, such as one among the user device or computing devices depicted in FIGS. 1-6. Moreover, one or more portions of the method 800 can be implemented as an algorithm on the hardware components of the device(s) described herein (e.g., as in FIGS. 1-6) to, for example, determine user device location. FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure.

At (801), the method 800 can include obtaining location history and/or device sensor data of a user device. For example, the user device can obtain a location history as described above with respect to FIG. 7 at (701) and/or the user device can obtain device sensor data as described above with respect to FIG. 7 at (704).

At (802), the method 800 can include determining a size of the location history window of the user device. The method 800 can include determining the size of the location history based at least in part on the location history and/or device sensor data of the user device. For example, a user device 210 can determine a speed and/or direction based at least in part on any two or more locations among the location history 220 and/or location history window 240. In some implementations, the method 800 can include determining a speed and/or direction based at least in part on the device sensor data. For example, a user device 410, 510, and/or 610 can determine the speed and/or direction based at least in part on a change in position 401, 501, and/or 601, respectively. In some implementations, the method 800 can determine a speed and/or direction of a user device based at least in part on both a location history and device sensor data. For example, a user device can combine a speed and/or direction determined based on the location history with a speed and/or direction determined based on the device sensor data by taking an average. The user device can determine a size a location history window based at least in part on the average speed and/or direction.

At (803), the method 800 can include determining a location history window based at least in part on the determined size of the location history window. For example, as shown in FIGS. 3A-B, the user device 310 can determine a constant speed, zero rotation, and no change in direction. In this case, the user device 310 can determine that a location history window 340 is the same as location history 320. In another example, with reference to FIGS. 4A-B, the user device 410 can determine acceleration in a particular direction, zero rotation, and/or no change in direction. In this case, the computing device 410 can determine the location history window 440, as location 4001 is determined to be too far back in time to be relevant to a location of the user device 410 at a current time. In another example, with reference to FIGS. 5A-B, the user device 510 can determine a constant speed, some rotation, and/or no change in direction. In this case, the computing device 510 can determine the location history window 540, as locations 5004 and 5005 are determined to be too far back in time to be relevant to a current position of the user device 510. In another example, with reference to FIGS. 6A-B, the user device 610 can determine a constant speed, no rotation, and/or a change in direction. In this case, the computing device 610 can determine the location history window 640, as location 6004 is determined to be too far back in time to be relevant to a current position of the user device 610. In some implementations, a user device can experience a change in position in more than one dimension such as any two or more of an acceleration, a rotation, and a change in direction. In these cases, the user device can calculate an average, assign weights, select a smallest, etc. among one or more location history windows calculated for each change in position in each dimension, to determine a location history window that contains locations having a greater relevance on a current location of the user device.

At (804), the method 800 can include applying a smoothing transformation to the location history window to determine one or more predicted locations corresponding to the user device at a current time. For example, a user device 210, 410, 510 or 610 can determine predicted location(s) 230, 430, 530, or 630 by applying a smoothing transformation on location history window 240, 440, 540, or 640, respectively.

At (805), the method 800 can determine a location of the user device based at least in part on the one or more predicted locations. For example, as described above with respect to FIG. 2, the user device 210 can determine the location 202 of the user device 210 at a current time based at least in part on the one or more predicted locations of the user device 210.

Figure 9:
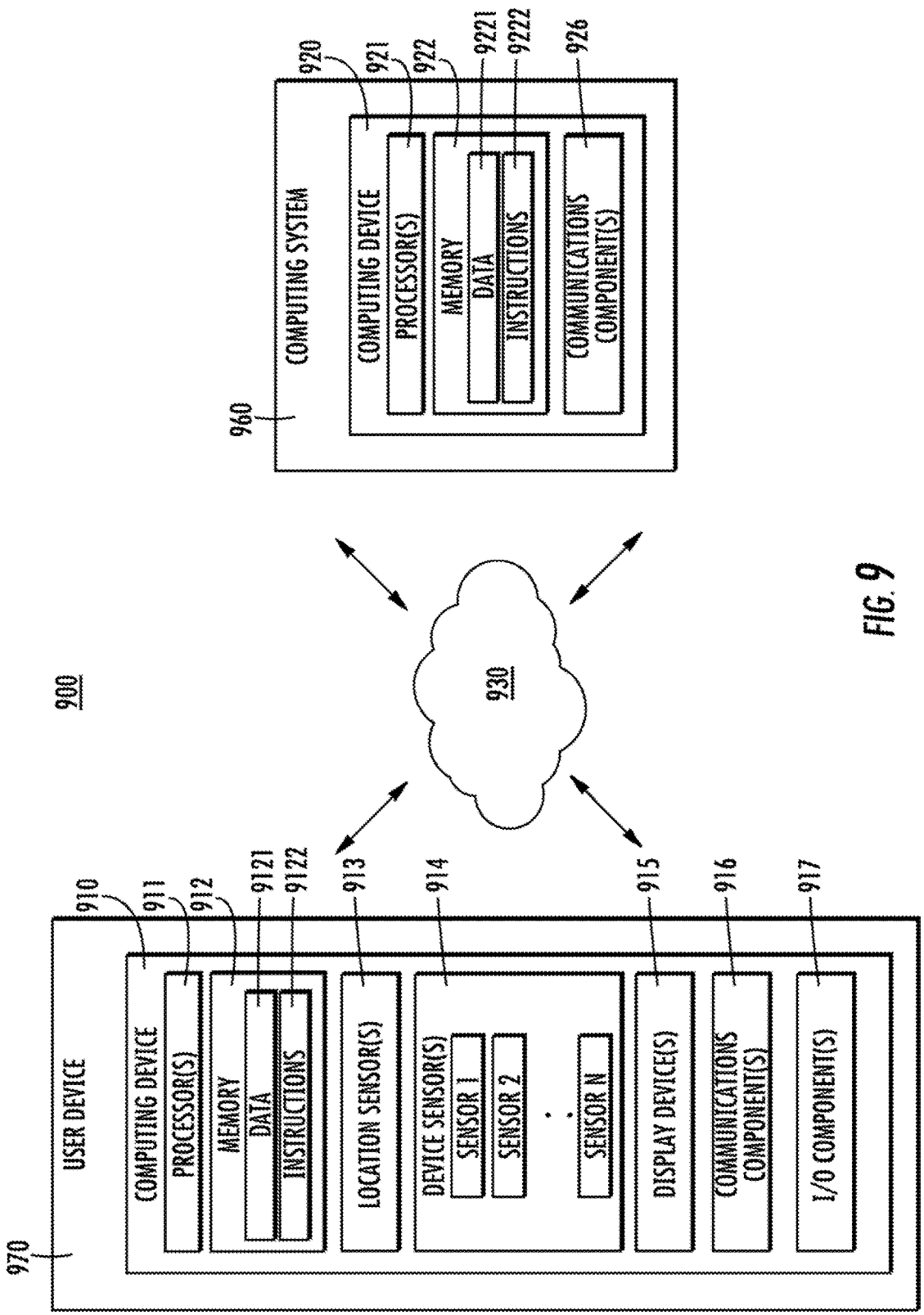
FIG. 9 depicts an illustrative system, in accordance with some implementations of the present disclosure.

FIG. 9 depicts an example computing system 900 that can be used to implement the systems and methods according to example aspects of the present disclosure. The system 900 can be implemented using a client-server architecture that includes the computing system 960 (e.g., including one or more servers) that communicates with one or more user devices 910 over a network 930. The system 900 can be implemented using other suitable architectures, such as a single computing device.

The system 900 includes the computing system 960 that can include, for instance, a web server and/or a cloud-based server system. The computing system 960 can be implemented using any suitable one or more computing devices 920. The computing device 920 can have one or more processors 921 and one or more memory 922. The computing device 920 can also include communications component(s) 926 used to communicate with one or more other component of the system 900 (e.g., one or more user devices 910) over the network 930. The communications component(s) 926 can include any suitable components for interfacing with one more networks, including for example, transmitters, receivers, ports, controllers, antennas, or other suitable components.

The one or more processors 921 can include any suitable processing device, such as a microprocessor, microcontroller, integrated circuit, logic device, or other suitable processing device. The memory 922 can include one or more computer-readable media, including, but not limited to, non-transitory computer-readable media, RAM, ROM, hard drives, flash drives, or other memory devices. The memory 922 can store information accessible by the one or more processors 921, including computer-readable instructions 9222 that can be executed by the one or more processors 921. The instructions 9222 can be any set of instructions that when executed by the one or more processors 921, cause the one or more processors 921 to perform operations. In some embodiments, the instructions 9222 can be executed by the one or more processors 921 to cause the one or more processor 921 to perform operations, such as any of the operations and functions for which the computing system 960 and/or the computing devices 920 are configured, the operations for determining a user device location and improving a stability of a displayed user location (e.g., methods 700, 800), as described herein, and/or any other operations or functions of the computing system 960 and/or the computing devices 920. The instructions 9222 can be software written in any suitable programming language or can be implemented in hardware. Additionally, and/or alternatively, the instructions 9222 can be executed in logically and/or virtually separate threads on processor 921.

As shown in FIG. 9, the memory 922 can also store data 9221 that can be retrieved, manipulated, created, or stored by the one or more processors 921. The data 9221 can include, for instance, data associated with a location history, location history window, one or more location sensors, one or more device sensors, and/or other data or information. The data 9221 can be stored in one or more databases. The one or more databases can be connected to the computing device 920 by a high bandwidth LAN or WAN, or can also be connected to computing devices 920 through network 930. The one or more databases can be split up so that they are located in multiple locales.

The computing device 920 can exchange data with one or more user devices 910 over the network 930. Although one user device 970 is illustrated in FIG. 9 (and herein), any number of user devices 910 can be connected to computing devices 920 over the network 930. Each of the user devices 910 can be any suitable type of computing device, such as a general purpose computer, special purpose computer, laptop, desktop, mobile device, navigation system, smartphone, tablet, wearable computing device, a display with one or more processors, or other suitable computing device.

A user device 970 can include one or more computing devices 910. The one or more computing devices 910 can include one or more processors 911 and memory 912. The one or more processors 911 can include one or more central processing units (CPUs), graphics processing units (GPUs) dedicated to efficiently rendering images or performing other specialized calculations, and/or other processing devices. The memory 912 can include one or more computer-readable media and can store information accessible by the one or more processors 911, including instructions 9122 that can be executed by the one or more processors 911 and data 9121. For instance, the memory 912 can store instructions 9122 for displaying a location of a user on one or more display devices 915, according to example aspects of the present disclosure. In some embodiments, the instructions 9122 can be executed by the one or more processors 911 to cause the one or more processor 911 to perform operations, such as any of the operations and functions for which the user device 9 is configured, as described herein, and/or any other operations or functions of the user device 970. The instructions 9122 can be software written in any suitable programming language or can be implemented in hardware. Additionally, and/or alternatively, the instructions 9122 can be executed in logically and/or virtually separate threads on processors 911.

The user device 970 of FIG. 9 can include various input and/or output component(s) 917 for providing and receiving information from a user, such as a touch screen, touch pad, data entry keys, speakers, and/or a microphone suitable for voice recognition. The user device 970 can also include various output component(s). For instance, the user device 970 can have one or more display devices 915 for displaying a location of a user according to example aspects of the present disclosure. The user device 970 can also include speakers, etc. Additionally, and/or alternatively, the user device 970 can include one or more location sensors 913 and/or one or more device sensors 914 associated with the user device 970, as described herein.

The user device 970 can also include one or more communications components 916 to communicate with one or more other components of system 900 (e.g., computing system 960) over the network 930. The communications components 916 can include any suitable components for interfacing with one more networks, including for example, transmitters, receivers, ports, controllers, antennas, or other suitable components.

The network 930 can be any type of communications network, such as a local area network (e.g. intranet), wide area network (e.g. Internet), cellular network, or some combination thereof. The network 930 can also include a direct connection between a user device 970 and the computing system 960. In general, communication between computing system 960 and a user device 970 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Furthermore, computing tasks discussed herein as being performed at a computing device that is remote from the user device (e.g., a server system) can instead be performed at a user device. Likewise, computing tasks discussed herein as being performed at the user device can instead be performed at computing device that is remote from the user device (e.g., a server system).

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of determining user device location, comprising:
    obtaining, by one or more computing devices, a location history of the user device from one or more sources, wherein the location history comprises one or more locations associated with the user device at one or more previous times;
    determining, by the one or more computing devices, a location history window of the user device based at least in part on the location history, wherein the location history window comprises one or more locations associated with the user device at one or more previous times that are within a recent time window, and wherein a size of the location history window is based at least in part on a change in position of the user device;
    determining, by the one or more computing devices, a first geographic area corresponding to a location of the user device at a current time based at least in part on an application of a smoothing transformation to one or more locations in the location history window;
    determining, by the one or more computing devices, a second geographic area corresponding to a location of the user device at the current time based at least in part on at least one of a location estimate of the user device at the current time and device sensor data of the user device;
    determining, by the one or more computing devices, a location of the user device based at least in part on the first geographic area and the second geographic area; and
    providing, by the one or more computing devices, data indicative of the location of the user device to a display device for display.

2. The computer-implemented method of claim 1, further comprising:
    obtaining, by the one or more computing devices, a location estimate of the user device, wherein the location estimate comprises one or more approximate locations of the user device at the current time; and
    determining, by the one or more computing devices, the location of the user device based at least in part on the location estimate.

3. The computer-implemented method of claim 1, further comprising:
obtaining, by the one or more computing devices, device sensor data of the user device, wherein the device sensor data comprises data indicative of a change in position of the user device; and
determining, by the one or more computing devices, the location of the user device based at least in part on the device sensor data.

4. The computer-implemented method of claim 1, further comprising:
obtaining, by the one or more computing devices, a location estimate of the user device, wherein the location estimate comprises one or more locations associated with the user device at the current time;
obtaining, by the one or more computing devices, device sensor data of the user device, wherein the device sensor data comprises data indicative of a change in position of the user device; and
determining, by the one or more computing devices, the location of the user device based at least in part on the location estimate and the device sensor data.

5. The computer-implemented method of claim 4, further comprising:
obtaining, by the one or more computing devices, the location estimate from one or more location sensors on the user device; and
obtaining, by the one or more computing devices, the device sensor data from one or more device sensors on the user device.

6. The computer-implemented method of claim 1, wherein the location history is based at least in part on one or more previous location estimates, each comprising one or more approximate locations associated with the user device at a previous time.

7. A computing system, comprising:
one or more processors; and
one or more memory devices, the one or more memory devices storing computer-readable instructions that when executed by the one or more processors cause the one or more processors to perform operations, the operations comprising:
obtaining a location history of the user device from one or more sources, wherein the location history comprises one or more locations associated with the user device at one or more previous times;
determining a size of a location history window of the user device based at least in part on a change in position of the user device;
determining the location history window of the user device based at least in part on the location history and the determined size of the location history window, wherein the location history window comprises one or more locations associated with the user device at one or more previous times that are within a recent time window;
determining a first geographic area corresponding to a location of the user device at a current time, based at least in part on an application of a smoothing transformation to one or more locations in the location history window;
determining a second geographic area corresponding to a location of the user device at the current time based at least in part on at least one of a location estimate of the user device at the current time and device sensor data of the user device; and
determining a location of the user device based at least in part on the first geographic area and the second geographic area.

8. The computing system of claim 7, wherein the operations further comprise:
determining the change in position of the user device based at least in part on one or more locations associated with the user device in the location history.

9. The computing system of claim 7, wherein the operations further comprise:
obtaining a location estimate of the user device, wherein the location estimate comprises one or more approximate locations associated with the user device at the current time; and
determining the location of the user device based at least in part on the location estimate.

10. The computing system of claim 7, wherein the operations further comprise:
obtaining device sensor data of the user device, wherein the device sensor data comprises data indicative of a change in position of the user device; and
determining the location of the user device based at least in part on the device sensor data.

11. A user computing device:
a display device;
one or more processors;
one or more memory devices, the one or more memory devices storing computer-readable instructions that when executed by the one or more processors cause the one or more processors to perform operations, the operations comprising:
obtaining a location history of the user device, wherein the location history comprises one or more locations associated with the user device at one or more previous times;
determining a change in position of the user device based at least in part on the location history and device sensor data of the user device;
determining a size of a location history window based at least in part on the change in position of the user device;
determining a location history window of the user device based at least in part on the location history and the determined size of the location history window, wherein the location history window comprises one or more locations associated with the user device at one or more previous times that are within a recent time window;
determining a first geographic area corresponding to a location of the user device at a current time, based at least in part on an application of a smoothing transformation to one or more locations associated with the user device in the location history window;
determining a second geographic area corresponding to a location of the user device at the current time based at least in part on at least one of a location estimate of the user device at the current time and device sensor data of the user device; and
determining a location of the user device based at least in part on the first geographic area and the second geographic area of the user device.

12. The user device of claim 11, further comprising:
providing data indicative of the location of the user device to the display device.

13. The user device of claim 11, wherein the operations further comprise:

obtaining a location estimate of the user device, wherein the location estimate comprises one or more approximate locations associated with the user device at the current time;

obtaining the device sensor data of the user device, wherein the device sensor data comprises data indicative of the change in position of the user device; and determining the location of the user device based at least in part on the location estimate and device sensor data of the user device.

* * * * *